United States Patent
Riccitelli et al.

(10) Patent No.: US 6,565,303 B1
(45) Date of Patent: May 20, 2003

(54) WASHER AND ASSEMBLY OF SAME EMPLOYING A SECURING MEMBER

(75) Inventors: Martin G. Riccitelli, Montgomery, MA (US); Tad A. Weiss, Westhampton, MA (US); Stanley W. Choiniere, Southwick, MA (US)

(73) Assignee: Olympic Manufacturing Group, Inc., Agawam, MA (US)

( * ) Notice: Subject to any disclaimer, the term of this patent is extended or adjusted under 35 U.S.C. 154(b) by 0 days.

(21) Appl. No.: 09/906,567

(22) Filed: Jul. 16, 2001

(51) Int. Cl.[7] ............. F16B 33/00; F16B 43/00
(52) U.S. Cl. ............. 411/533; 411/368; 411/433
(58) Field of Search ............ 411/368, 369, 411/370, 531, 533, 433, 527

(56) References Cited

U.S. PATENT DOCUMENTS

| | | | | |
|---|---|---|---|---|
| 4,726,164 A | * | 2/1988 | Reinwall et al. | 411/533 X |
| 5,207,535 A | * | 5/1993 | Saab | 411/533 X |
| 5,707,193 A | * | 1/1998 | Hasegawa | 411/527 X |
| 5,908,278 A | * | 6/1999 | Hasan et al. | 411/533 |
| 6,308,483 B1 | * | 10/2001 | Romine | 411/533 X |

* cited by examiner

Primary Examiner—Neill Wilson

(57) ABSTRACT

The present invention is a washer typically used in fastening insulation to a roof deck. The washer is secured to the deck by a securing member received through an opening in the washer. The washer is provided with a body having a top surface, a thickness dimension, and bottom surface having a substantially planar region. The body is further provided with an opening sized to permit a securing member to pass therethrough. A plurality of fingers are positioned around the opening on the bottom surface of the body. The fingers extend away from the bottom surface, the fingers being positioned around the opening and having at least a portion that extends over the opening. In yet another embodiment, the present invention is, in combination, a washer and a securing member received in an opening provided in the washer. The washer is provided with a body having a top surface, a thickness dimension, and bottom surface having a substantially planar region, the body further provided with an opening sized to permit a securing member to pass therethrough. A plurality of flexible fingers are positioned around the opening on the bottom side of the body. The fingers extend away from the bottom surface, the fingers being positioned about the opening and having at least a portion that engage the securing member as it passes the fingers.

20 Claims, 3 Drawing Sheets

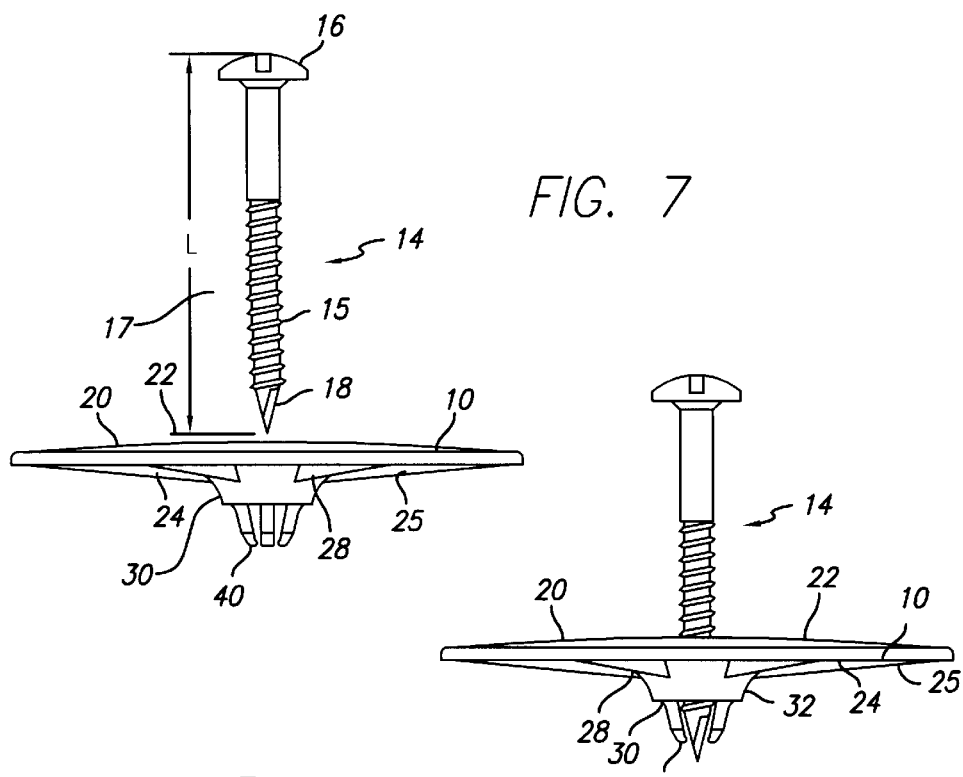
FIG. 7
FIG. 8
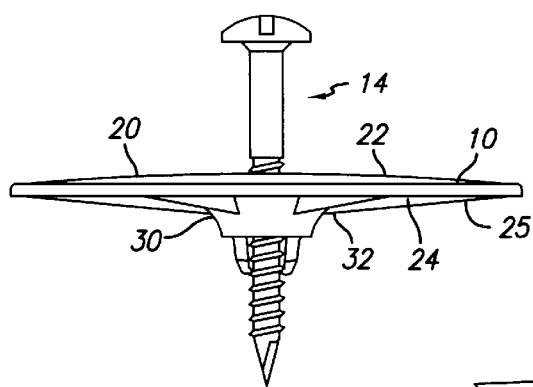
FIG. 9
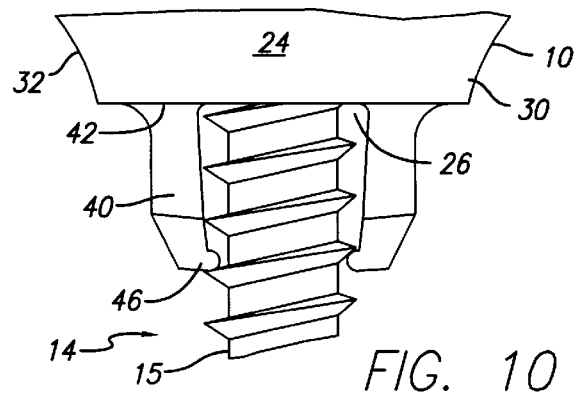
FIG. 10

WASHER AND ASSEMBLY OF SAME EMPLOYING A SECURING MEMBER

BACKGROUND OF THE INVENTION

This invention relates to washers that are used in the roofing trade, and further, to combinations of washers and securing members used in this trade. These washers are typically employed in fastening insulation to a roof deck. The washers receive a securing member, such as a threaded screw, through an opening in the washer. The securing member fastens the washer to the roof deck.

Securing members and washers are often packaged in a partially assembled form in which the securing member is inserted within an opening in the washer. By pre-assembling the components, the end user, such as a roofing contractor, does not have to undertake the assembly. This provides a savings in labor costs to the end user, who would otherwise have to pay laborers to assemble hundreds, and possibly thousands, of components per job.

In any event, the assembly of the components is merely shifted to another party, who may be the manufacturer. During assembly of the components, the securing member is aligned so that its axis is substantially perpendicular to the washer. The opening in the washer is provided with a thread engaging-portion that enters the threads of the securing member. The securing member is then threaded through the opening in the washer. To assemble the components, the securing member is screwed into the washer. Since the securing member must be completely screwed into the washer, or at least screwed in enough to avoid separation of the parts, assembling each combination consumes a substantial amount of time. Since thousands, if not hundreds of thousands, of components are produced by the manufacturer, this aspect of assembly is enormously time consuming and drives up production costs. Also, this arrangement provides no means of preventing back out of the securing member.

SUMMARY OF THE INVENTION

In one embodiment, the present invention is a washer used in fastening insulation to a roof deck. The washer is secured to the deck by a securing member received through an opening in the washer. The securing member used with the washer has a threaded shaft and a head which has a cross sectional area greater than the cross sectional area of the opening of the washer. The washer is provided with a body having a top surface, a thickness dimension, and bottom surface having a substantially planar region. The body is further provided with an opening sized to permit a securing member to pass therethrough. More than one finger is positioned around the opening on the bottom surface of the body. The fingers extend away from the bottom surface, the fingers being positioned around the opening and having at least a portion that extends over the opening. The fingers may be angled in towards the opening. In another embodiment, each finger of the plurality of fingers is provided with an opposing finger, that is, a finger positioned directly across the opening. In yet another embodiment, the fingers may extend substantially perpendicular to the bottom surface of the washer. Nibs may then be provided on the distal ends of the fingers. The nibs are positioned in towards the opening, and at least a portion of the nibs extend over the opening. Embodiments having three fingers, four fingers, or any number of fingers found to be acceptable can be produced. Embodiments having two fingers are also possible. The width of the fingers can be increased to traverse a larger segment of the perimeter of the opening.

In yet another embodiment, the present invention is, in combination, a washer and a securing member received in an opening provided in the washer. The washer is provided with a body having a top surface, a thickness dimension, and bottom surface having a substantially planar region, the body further provided with an opening sized to permit a securing member to pass therethrough. A plurality of flexible fingers are positioned around the opening on the bottom side of the body. The fingers extend away from the bottom surface, the fingers being positioned about the opening and having at least a portion that engage the securing member as it passes the fingers. The fingers may be angled inward towards the opening, or if the nib arrangement as described is provided, then at least a portion of the nibs extend over the opening.

The securing member has a shaft that is threaded over at least a portion of the shaft length. The shaft further is provided with a head attached to one end of the shaft. The head, which has a cross sectional area greater than the cross sectional area of the opening, is provided with a groove or bore on its upper surface to allow engagement of the securing member with a tool that will be used in rotating the securing member into a secured position within a roofing deck.

When the securing member is moved through the opening, it will engage the fingers. With this arrangement, the securing member can be pushed through the opening, and through the fingers, which provides for a relatively easy-to-assemble securing member and washer combination. Further, the fingers (or nibs) engage the shaft of the securing member, such as by extending into the space between adjacent threads. When the fingers are engaged with the securing member, back-out of the securing member, that is, travel of the securing member in the direction opposite the direction it traveled when it was inserted, is prevented, since the fingers provide interference to movement of the screw in the direction of backout.

"Extend[s] over the opening" or "extending over the opening", as used herein, refers to the engagement of the fingers with a virtual object having substantially the same cross sectional area as the opening. That is, a virtual object can be imagined having a volume defined by the cross sectional area of the opening and the distance (i.e., length) from the opening. As the distance from the opening is lengthened, the virtual object contacts the fingers as it moves past them. Thus, when it is said that the fingers, nibs, etc. (or a portion thereof) "extend[s] over the opening", they enter the space taken up by the virtual object.

When the embodiment calls for a securing member in combination with the washer, the fingers engage the securing member as the securing member moves past the fingers.

BRIEF DESCRIPTION OF THE DRAWINGS

FIG. 7 is a side view of another embodiment of the present invention in accordance with the present invention with a securing member shown above the washer. The securing member and washer are in an unassembled state;

FIG. 8 is a side elevational view of another embodiment of the present invention with a securing member shown as it enters the washer. The finger in front of the screw has been omitted from the drawing for purposes of clarity;

FIG. 9 is a side elevational view of a another embodiment of the present invention with a securing member shown within the washer (assembled state). The finger in front of the screw has been omitted from the drawing for purposes of clarity;

FIG. 10 is a perspective view of another embodiment of the present invention with a securing member shown within the washer (assembled state). The finger in front of the screw has been omitted from the drawing for purposes of clarity.

DETAILED DESCRIPTION OF THE INVENTION

Figure 1:
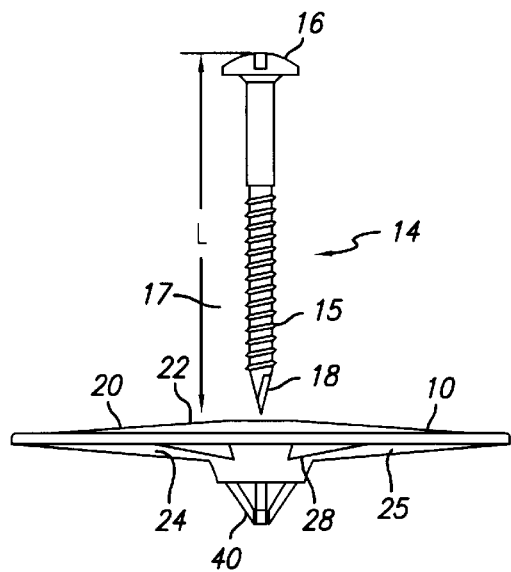
FIG. 1 is a side view of a washer in accordance with the present invention with a securing member shown above the washer. The securing member and washer are in an unassembled state.
Figure 2:
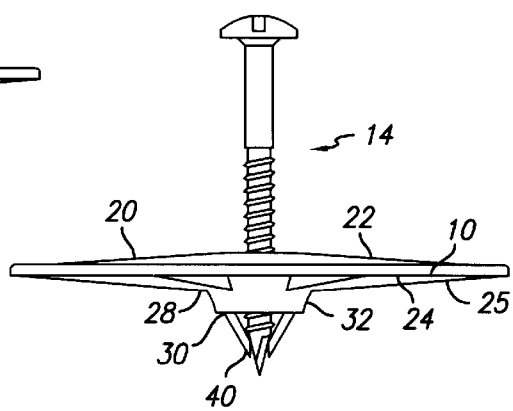
FIG. 2 is a side view of a washer in accordance with the present invention with a securing member shown as it enters the washer. The finger in front of the screw has been omitted from the drawing for purposes of clarity.

Washer 10 is constructed to receive a securing member 14 having a length dimension L that extends in the axial direction of the shaft 15. The securing member 14 has a head 16 attached at an end of the shaft 15. Shaft 15 is provided with threads 17 over at least a portion of its length. The washer 10 and securing member 14 are used in securing insulation to the deck of a roof (not shown).

Figure 5:
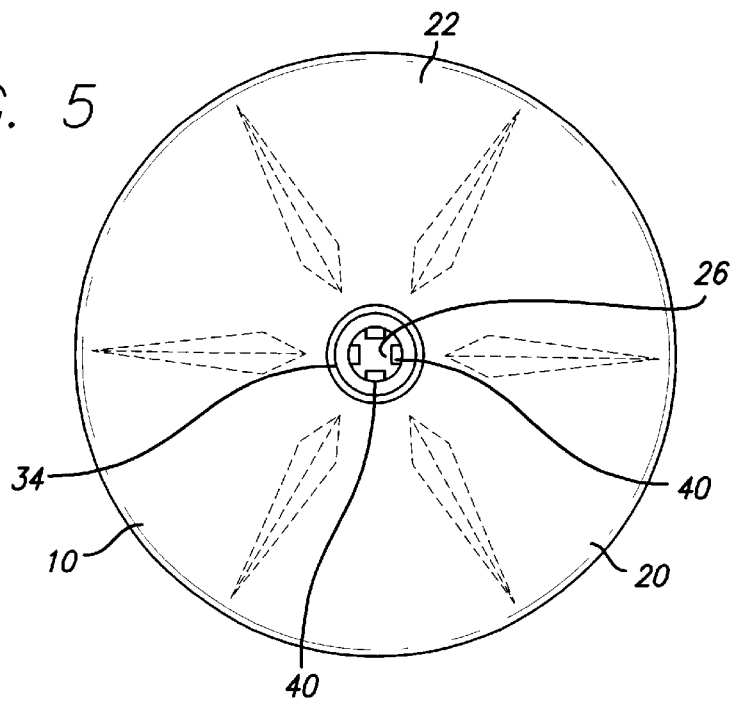
FIG. 5 shows a top view of a washer of the present invention.
Figure 5A:
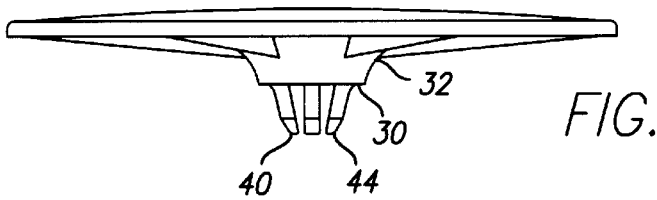
FIG. 5A shows a side elevational view of a washer of the present invention.
Figure 6:
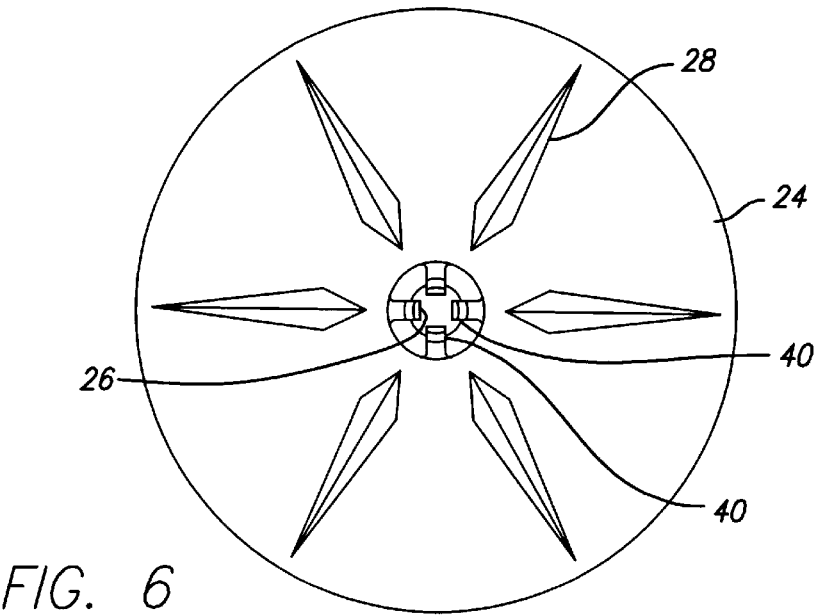
FIG. 6 shows a bottom view of a washer of the present invention.

The washer 10 has a body 20 configured in any suitable shape, such as an annular shape, as illustrated in FIGS. 5 and 6. The body 20 has a thickness dimension defined by a top surface 22 and a bottom surface 24 having a substantially flat portion 25 which is configured to rest against the roof deck. In one embodiment, the top surface of the body may not be planar. For instance, the top surface may be slightly concave. The body is further provided with an opening 26 which passes through the body 20. The opening 26 is sized to permit the shaft 15 of the securing member 14 to pass there through, while the head 16 of the securing member 14 is sized to provide a stop to movement through the washer. In one embodiment, the opening may be provided in the center of the body, as shown in FIG. 5 and 6.

The bottom surface 24 may be provided with a series of radially extending ridges 28, best seen in FIG. 6. The bottom surface may further be provided with a platform 30 having tapered sidewalls 32, where the opening is situated. Further, the opening may be located in a recessed portion 34 on the top surface 22, which helps insure that the head 16 of the securing member 14 will be lower than the top surface 22 of the body 20 after installation.

A plurality of fingers 40 are positioned on the bottom surface around the opening. The fingers extend away from the bottom surface and are angled inward toward the opening and extend over the opening so that when a securing member is inserted into the opening, the fingers, or a portion thereof, engage the shaft 15 of the securing member 14. In one embodiment, the fingers are constructed of a resilient flexible thermoplastic material that permits the securing member 14 deflect the fingers outward, permitting the securing member to pass through it. However, when the back out force is applied to the securing member, a force is applied to the tops of the fingers, and, due to the angled configuration of the fingers, the fingers are pulled inward, towards the securing member, which arrangement resists the back out force applied by the securing member.

Figure 3:
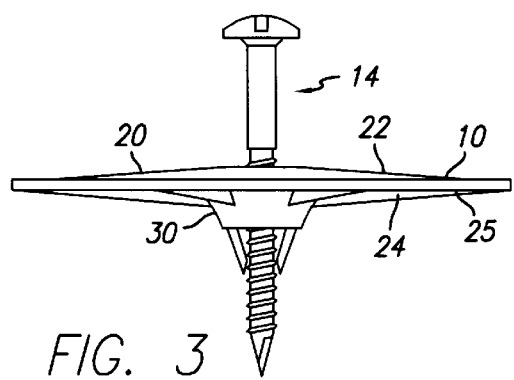
FIG. 3 is a side view of a washer in accordance with the present invention with a securing member shown within the washer (assembled state). The finger in front of the screw has been omitted from the drawing for purposes of clarity.
Figure 4:
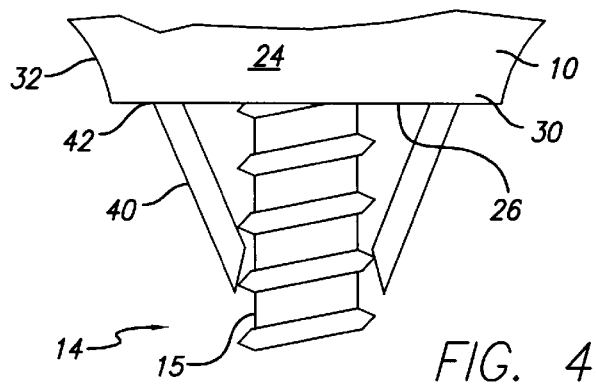
FIG. 4 is a perspective view of a washer in accordance with the present invention with a securing member shown within the washer (assembled state). The finger in front of the screw has been omitted from the drawing for purposes of clarity.

The fingers are positioned around the perimeter of the opening. The fingers 40 extend away from the bottom surface 24. With respect to the base 42 of the finger 40, that is, where the finger joins the bottom surface 24, the finger is angled, so that its distal end 44 extends over the opening 26. In this arrangement, it is positioned to engage the securing member as it passes the fingers, as shown in FIGS. 3 and 4. Further, the distal ends 44 of the fingers are in stabilizing contact with the securing member along a substantial portion of its perimeter. Moreover, stabilizing contact may take place in two or more adjacent pitches along the securing member. It is believed that contact over a substantial portion of the perimeter maintains rigidity and stability the assembly. Screw guns and cones that accept the washer are used to install these assemblies, and the roofer who installs the assemblies does so from a standing position. Maintaining rigidity and stability should improve the quality, ease, and accuracy of the installation. By maintaining stabilizing contact in this manner, the securing member is maintained perpendicular to the washer 10, which should facilitate the insertion of the securing member substantially straight into the roofing deck, which is desirable.

In another embodiment, shown in FIGS. 7–10, the fingers 40 may not be angled, or are relatively less angled. Rather, the fingers may extend away from the bottom surface, substantially perpendicular thereto, and the fingers 40 are provided with nibs 46 near the distal end. The nibs extend inward, and engage the shaft of the securing member. See FIGS. 8–10.

The fingers, when in contact with the securing member, prevent backout of the screw. That is, the securing member is prevented from rotating out of the washer, due in part to the presence of the fingers within adjacent pitches. Also, the fingers provide resistance to pulling the screw out of the washer.

The number of fingers provided on the washer are the number necessary to insure adequate resistance of backout. Three fingers arranged around the opening equidistant from each other, may be acceptable. Four or more fingers may provide additional stability.

I claim:

1. A washer for receiving a securing member in an opening provided therein, the opening having a cross sectional area, the securing member having a threaded shaft and a head which has a cross sectional area greater than the cross sectional area of the opening, the washer comprising:

a body having a substantially planar top surface, a thickness dimension, and a bottom surface having a substantially planar region, the body further having an opening sized to permit a securing member to pass therethrough;

a plurality of flexible fingers positioned around the opening on the bottom side of the body, the fingers extending away from the bottom surface, the fingers being positioned about the opening and having at least a portion extending into the space over the opening, wherein the bottom surface is provided with a platform that extends away from the substantially planar region of the bottom surface where the opening and fingers are situated.

2. The washer of claim 1 wherein a portion of the fingers extends into the space above the opening.

3. The washer of claim 1 wherein the fingers are angled inward.

4. The washer of claim 1 wherein the fingers have a distal end that extends over the opening.

5. The washer of claim 1 wherein the fingers are provided with nibs that extend over the opening.

6. The washer of claim 1 having three fingers.

7. The washer of claim 1 having four fingers.

8. The washer of claim 1 having greater than four fingers.

9. The washer of claim 1 wherein the top surface is provided with a recess in which the opening is situated, the recess having a cross sectional area sized to receive the head of the securing member.

10. The washer of claim 1 wherein the platform is provided with a tapered sidewall that joins the platform to the substantially planar region of the bottom surface.

11. In combination, a washer and a securing member received in an opening provided in the washer comprised of: a washer provided with a body having a substantially planar top surface, a thickness dimension, and bottom surface having a substantially planar region, the body further having an opening sized to permit a securing member to pass therethrough, the opening having a cross-sectional area; a plurality of flexible fingers positioned around the opening on the bottom side of the body, the fingers extending away from the bottom surface, the fingers having at least a portion that extends into the space over the opening; and a securing member having a threaded shaft and a head which has a cross sectional area greater than the cross sectional area of the opening; wherein, when the securing member is moved through the opening and moved through the fingers, it becomes engaged with the fingers, wherein the bottom surface is provided with a platform that extends away from the substantially planar region of the bottom surface where the opening and fingers are situated.

12. The combination of claim 11 wherein the fingers engage the threaded portion of the shaft.

13. The combination of claim 11 wherein the fingers reside within adjacent threads of the threaded portion of the shaft.

14. The combination of claim 11 wherein the fingers are angled inward.

15. The combination of claim 11 wherein the fingers have a distal end that extends over the opening.

16. The combination of claim 11 wherein the fingers are provided with nibs that extend over the opening.

17. The combination of claim 11 wherein the washer has three fingers.

18. The combination of claim 11 wherein the washer has four fingers.

19. The combination of claim 11 wherein the top surface is provided with a recess in which the opening is situated, the recess having a cross sectional area sized to receive the head of the securing member.

20. The combination of claim 11 wherein the platform is provided with a tapered sidewall that joins the platform to the substantially planar region of the bottom surface.

* * * * *